Feb. 12, 1946. J. R. CAMPBELL 2,394,747
SNAP ACTING CONTROL DEVICE
Filed Jan. 15, 1945 5 Sheets-Sheet 1
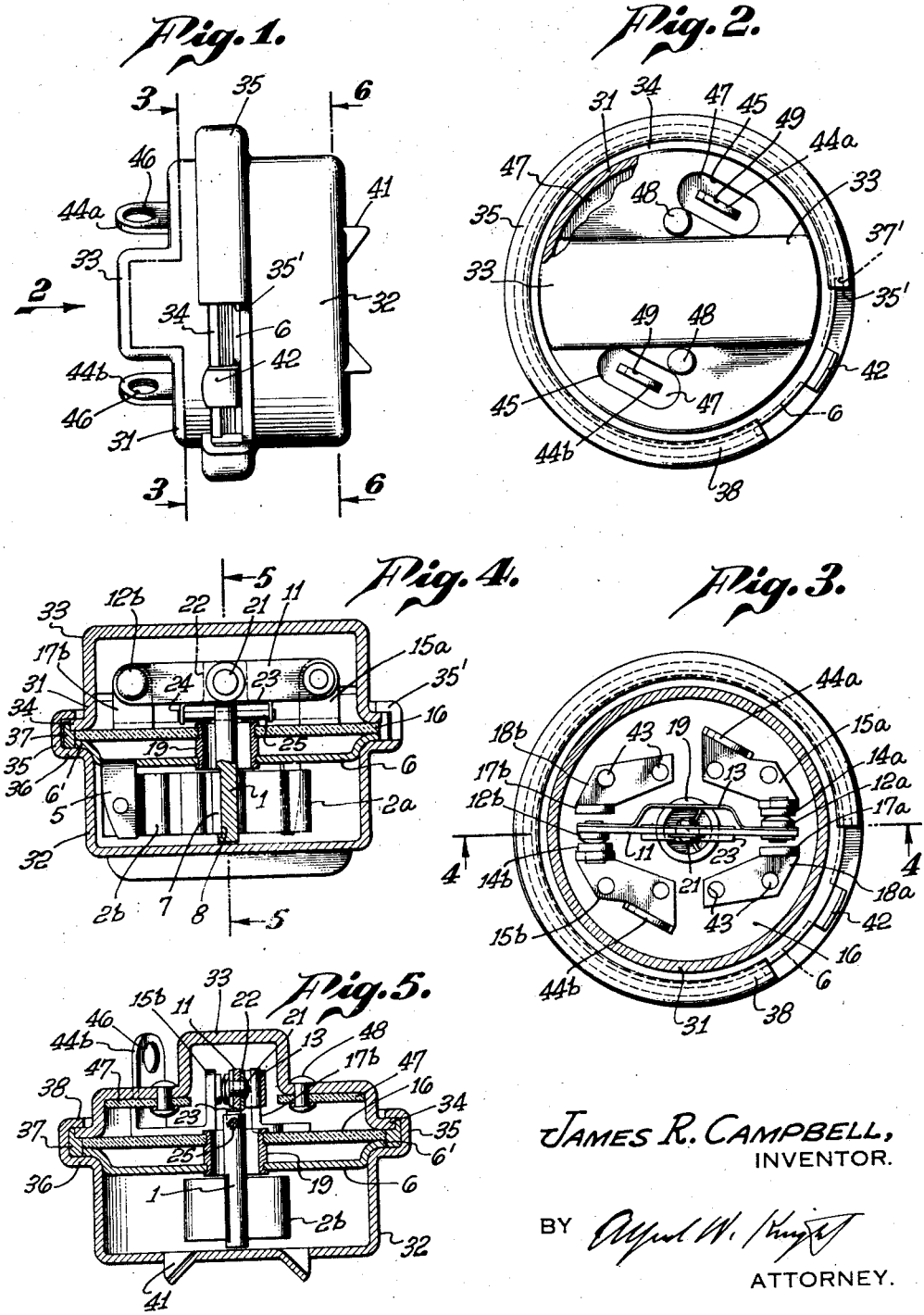
JAMES R. CAMPBELL,
INVENTOR.
BY [signature]
ATTORNEY.

Feb. 12, 1946. J. R. CAMPBELL 2,394,747
SNAP ACTING CONTROL DEVICE
Filed Jan. 15, 1945  5 Sheets-Sheet 2
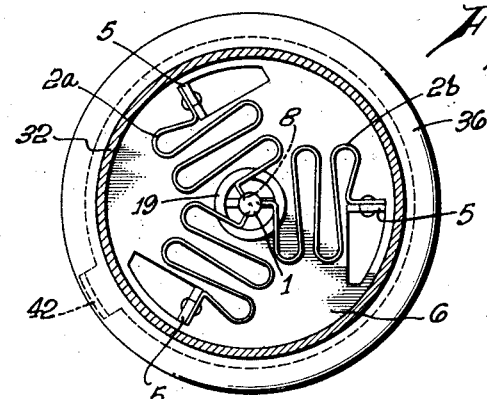
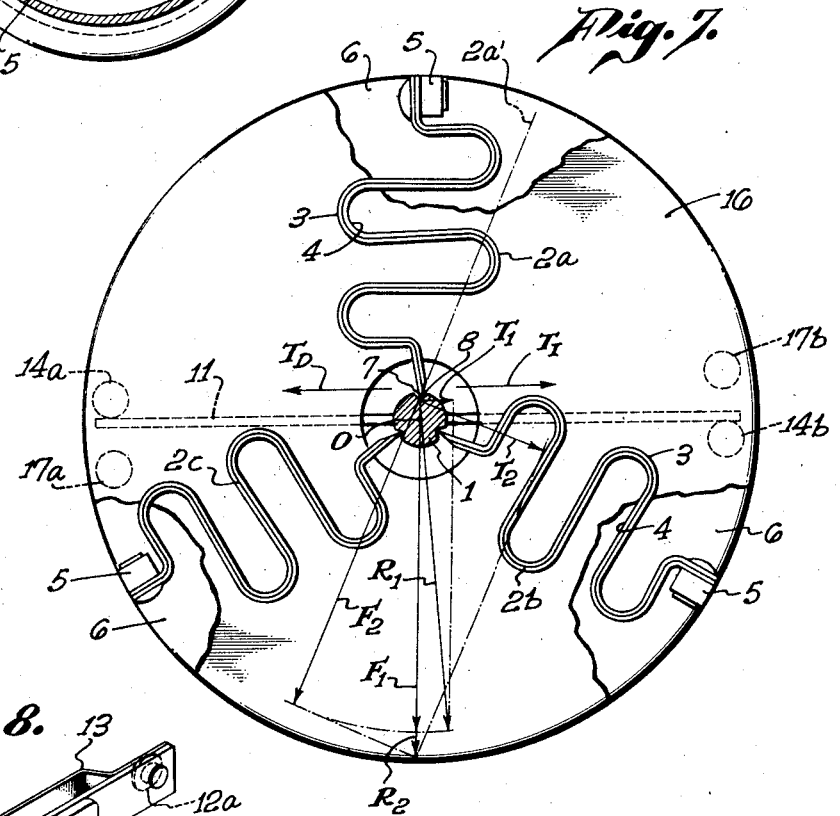
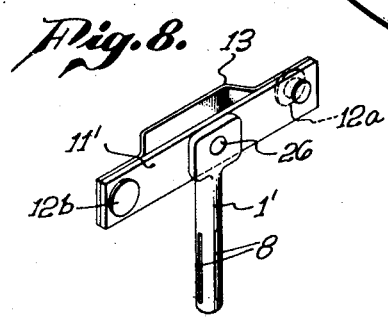
JAMES R. CAMPBELL,
INVENTOR.
BY
ATTORNEY.

Feb. 12, 1946.     J. R. CAMPBELL     2,394,747
SNAP ACTING CONTROL DEVICE
Filed Jan. 15, 1945     5 Sheets-Sheet 3

JAMES R. CAMPBELL,
INVENTOR.

BY
ATTORNEY.

Feb. 12, 1946.   J. R. CAMPBELL   2,394,747
SNAP ACTING CONTROL DEVICE
Filed Jan. 15, 1945   5 Sheets-Sheet 4

JAMES R. CAMPBELL,
INVENTOR.

BY
*Alfred W. Knight*
ATTORNEY.

Feb. 12, 1946.  J. R. CAMPBELL  2,394,747
SNAP ACTING CONTROL DEVICE
Filed Jan. 15, 1945  5 Sheets-Sheet 5

JAMES R. CAMPBELL,
INVENTOR.

BY *Alfred W. Knight*

ATTORNEY.

Patented Feb. 12, 1946

2,394,747

UNITED STATES PATENT OFFICE 2,394,747

SNAP ACTING CONTROL DEVICE

James R. Campbell, Laguna Beach, Calif., assignor to Paul Henry, Los Angeles, Calif.

Application January 15, 1945, Serial No. 572,823

17 Claims. (Cl. 200—67)

This invention is concerned with snap acting control mechanisms and aims to provide improvements therein. More particularly, the invention has for its object a novel snap action device for the control of valves, switches, and similar flow interrupting or flow altering means as a function of some mechanically registerable change in condition such as temperature, pressure, humidity, or mechanical displacement.

Snap acting devices for control of flow interrupting or flow altering means, such as valves, switches, and the like, should be positive in action, compact, rugged, and simple in construction; have a minimum of inertia in moving parts, have a minimum of friction in moving parts, be capable of operating on a very small differential of change in the condition to which it is responsive, be substantially unaffected by vibrations and shock, and be applicable and adjustable over a wide range of such condition.

The principal object of my invention is to provide a novel and advantageous type of snap acting control device which will fulfill all of these requirements.

A particular object of this invention is to provide a snap acting control device that will operate positively to actuate a flow controlling or flow interrupting member between its two positions, with a small differential in the condition to which it is responsive, that is, with a small difference between the values of such condition required for operation to one position or the other.

A further object is to provide a device that can be readily adjusted so as to provide snap action at different values or magnitudes of the condition to which it is responsive.

A further object is to provide a device that is inherently resistant to inadvertent operation from one position to the other due to effects of vibration. In this connection, a particular object is to provide a device utilizing a control member mounted for rotation between its two positions by thrust members responsive to changes in a condition, in which the thrust members are so arranged that the combined effect thereof tending to cause rotation of the control member is substantially unaffected by vibration, and in which the control member is rotationally balanced about its axis of rotation so as to be itself substantially unaffected by vibration.

The device of my invention, by which these desired objectives are accomplished, comprises a central shaft which is resiliently and rotatably engaged and supported by three or more resilient thrust members disposed at different angular positions about the central shaft and spaced less than 180° apart, with one or more of said thrust members affected by a change in condition in a manner to alter its resultant thrust against the central shaft. Rotation of the central shaft is limited by suitable fixed or adjustable stops and the central shaft rotates with snap action within the stop limits when a suitable change in the resultant thrust against the central shaft is effected. By connecting the central shaft to suitable flow interrupting or flow altering control means, positive and sudden action is imparted to the flow interrupting or flow altering control means. Inasmuch as the resultant thrust of the angularly spaced thrust members determines the point of snap, rotation (about the central shaft member as an axis) of the stops with respect to the thrust members, or vice versa, to various desired positions results in selecting various points or values of the changing condition, at which snap action will occur.

Further, by using three or more angularly spaced thrust members resiliently engaging and supporting the central shaft, the device has the novel feature of being self-aligning and self-compensating for discrepancies in either the thrust members or the central shaft. By using three equally spaced thrust members, the resultant forces are always equalized on all members (without adjustment or special operation) in a manner to produce a clearly defined net resultant force which produces the snap action. Also, this construction not only provides an easy device to build and calibrate but a device inherently resistant to effects of vibration. The worst effects of vibration occur when the vibration is imposed in the plane of motion of the moving parts, which in this case would be in a plane through the angularly spaced thrust members and perpendicular to the axis of the central shaft. Under this condition the net effective resultant force on the central shaft remains substantially the same with vibration because one thrust member's gain or loss of resultant thrust is the other's loss or gain. Also, the rotational snap action of the central shaft allows the use of a rotationally balanced arrangement of the flow interrupting or flow altering control member so that rotational effects from vibration of said control member are reduced to a minimum.

Supporting and engaging the central shaft by the three or more angularly spaced thrust members results in a minimum of friction by elimination of added bearings and also allows a design in which the central shaft is small and has a very low moment of inertia. Further, the small diameter of the central shaft member allows positive snap action rotation thereof with small changes in the resultant force of one or more of the thrust members and hence results in a device with an inherently low operating differential. Because of the aforementioned equalizing action of the three or more thrust members there is no tendency toward instability of operation even on a very small operating differential. The use of such angularly spaced thrust members engaging a relatively small central shaft offers an ideal means for proper distribution of stresses in the thrust members in that the tendency of a thrust member to exert a rotative thrust on the central shaft can be distributed in a positive and negative sense such that over part of the adjustable range the component of the thrust of such member will be clockwise and over the balance of the adjustable range the tangential component of the thrust will be counterclockwise. This condition provides an adjustable range of approximately twice the magnitude that is possible when a stressed member has all the loading incurred by adjustment taken in one direction only.

In a preferred form of the device, adapted for control of temperature, resilient bimetallic strips having different rates of thermal expansion of the two sides are employed for the angularly spaced thrust members. The bimetallic strips are preferably each formed into a series of loops extending substantially equally on both sides of a center line through the outer or mounting end and the inner or actuating end which engages the central shaft. These resilient bimetallic strips engage the central shaft, preferably through knife edges on the strips and V grooves on the shaft, with an inwardly directed force and it is preferable that the number of loops into which the strip is formed be the same on both sides of the center line so that the amount of inwardly directed force will not change with temperature changes and the snapping action of the device depends on the change in the tangential component of thrust developed by the bimetallic strips' reaction to temperature changes.

My invention will be more thoroughly understood in the light of the following detailed description and accompanying drawings in which:

Fig. 1 is a side elevation of a form of control device in accordance with my invention, adapted to open and close switch means in an electric circuit in response to variations in temperature;

Fig. 2 is a front elevation thereof, looking in the direction indicated by the arrow 2 in Fig. 1;

Fig. 3 is a vertical section on line 3—3 in Fig. 1;

Fig. 4 is an inverted horizontal section on line 4—4 in Fig. 3;

Fig. 5 is a sectional view on line 5—5 in Fig. 4;

Fig. 6 is a vertical section on line 6—6 in Fig. 1;

Fig. 7 is an enlarged diagrammatic view illustrating the principle of operation of a control device of the type shown in Figs. 1 to 6;

Fig. 8 is a perspective view of the central shaft and the control member actuated thereby, showing a somewhat modified construction that may be used in some cases;

Figure 9:
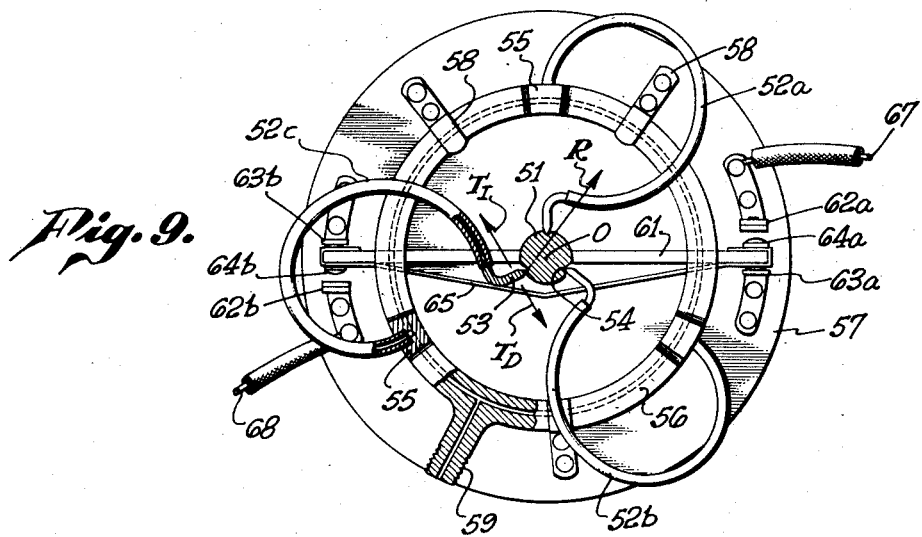
Fig. 9 is a front elevation of a modified form of control device, responsive to variations in pressure to operate an electric switch.

The control device shown in Figs. 1 to 6 and illustrated diagrammatically in Fig. 7 is of the thermostatic switch type. It comprises a central shaft 1 resiliently and rotatably engaged and supported by three temperature-responsive resilient thrust members 2a, 2b and 2c disposed in generally radial directions at different angular positions about said shaft and preferably spaced approximately 120° apart, as best shown in Figs. 6 and 7. Each of said thrust members is shown as a looped bimetallic strip having high-expanding and low-expanding side portions 3 and 4 respectively, secured at its outer end to a lug 5 projecting rearwardly from a supporting plate or disc 6. If desired, I may provide the device with more than three, for example, from four to six, such thrust members, preferably equally spaced from one another about the central shaft. For most purposes, however, I prefer to use only three of these resilient thrust members, as shown.

Each bimetallic member 2a, 2b and 2c is formed with two loops on each side of the radial center line. A given change in temperature will cause the loops on one side of the center line of each member to open up and those on the other side to close by a substantially equal amount, so that the inwardly directed component of thrust exerted by each of said members against shaft 1 remains substantially constant despite variations in temperature.

Each of the bimetallic members is preferably bevelled at its inner end to form a knife edge (as shown more clearly at 7 in Fig. 7), which engages shaft 1 in a V-shaped groove or indentation 8, said shaft being provided with three such grooves extending longitudinally and spaced approximately 120° apart circumferentially, to receive the knife-edged inner ends of the corresponding bimetallic thrust members. Each of the V-shaped notches or grooves is preferably rounded somewhat at its inner end, on a small radius of curvature, so as to ensure smooth rolling contact of the knife-edge tip 7 with the surface thereof and thus provide smooth and positive operation. The angle of each V-shaped groove 8 is shown as approximately 90°, while the angle of knife-edge 7 is shown as about 20°, thus permitting angular adjustment of the thrust members relative to the shaft as described hereinafter.

Connected to the forward end of shaft 1 is a control member comprising bar 11 extending diametrically with respect to said shaft and formed of mica or other suitable insulating material. Said control member functions as a switch for opening and closing an electric circuit, and also serves to limit the snap action rotative movement of the shaft in each direction by engagement with suitably positioned stop means.

Contact members 12a and 12b are mounted on the respective ends of bar 11 and are connected together by a conducting strip 13 whose central portion is bowed outwardly so as to be spaced from and free from contact with the means connecting the bar to shaft 1. Fixed contact members 14a and 14b are mounted on supporting brackets 15a and 15b secured to a supporting plate or disc 16 formed of mica or other suitable insulating material, and are positioned for engagement by contact members 12a and 12b upon movement of bar 11 in a counter-clockwise direction in Fig. 3, thus acting as stop members limiting rotative movement of shaft 1 in that direction. The forwardly projecting arms 17a and 17b of brackets 18a and 18b secured to supporting plate 16 are positioned for engagement by the respective ends of bar 11, and act as stop means to limit rotative movement of said bar and shaft 1 in the reverse direction. Shaft 1 extends through a sleeve 19 which engages centrally located openings in plates 6 and 16 and connects these plates together, while permitting relative rotation thereof for adjustment purposes as described hereinafter.

The switch shown is of the single throw type, adapted to close connection between contacts 14a and 14b on movement in one direction and to open the circuit upon movement in the opposite direction. It will be obvious that, if a double throw type of switch is desired, bar 11 could be provided with an additional set of contact members adapted to engage contact members secured to stop members 17a and 17b upon clockwise rotation in Fig. 3, in order to close another circuit.

In order to ensure good contact between contacts 12a, 12b and 14a, 14b, the bar 11 is preferably mounted on shaft 1 in such manner as to permit pivotal movement thereof about an axis extending parallel to the length of said bar. Thus, bar 11 is shown as secured by a rivet 21 to a forwardly projecting lug 22 on a metal strip 23 whose outer ends are bent rearward as shown at 24 and rotatably engage a pin 25. Said pin extends through the forward end of shaft 1, parallel to bar 11. Pin 25 may be rotatably mounted in shaft 1 or rigidly secured thereto, but is held against longitudinal movement relative to said shaft and also relative to strip 23. Upon rotation of shaft 1 in a counter-clockwise direction in Fig. 3, bar 11 is free to rock about the axis of pin 25 to a position in which contacts 12a and 12b firmly engage fixed contacts 14a and 14b, respectively.

For some purposes, the control member actuated by the shaft may be rigidly secured thereto. Such a construction is illustrated in Fig. 8, in which bar 11' is connected rigidly to the shaft 1', as by means of rivet 26. Shaft 1' is provided with V-shaped grooves 8 for supporting engagement by resilient thrust members, and bar 11' is adapted to engage stop means upon movement in either direction and is provided with contact members 12a and 12b and conductor strip 13, in the same manner as described above.

Suitable means are provided for maintaining the thrust member supporting plate 6 and the stop means supporting plate 16 in the desired relative positions, and preferably for enclosing the above described mechanism. I also prefer to provide for adjustment of the angular position of the radially disposed thrust members with respect to shaft 1, in order to vary the temperature at which the device may be set to operate. Due to engagement of bar 11 with stop members 12a, 12b or 17a, 17b, the limits of angular movement of the shaft 1 are defined by the position of plate 16, while the angular position of thrust members 2a, 2b and 2c is defined by the position of plate 6. Thus, the adjustment to cause the snap action to occur at different temperature values may be effected by relative rotation of plates 6 and 16 about shaft 1. Either or both of these plates might be rotatably mounted for this purpose. However, it is generally desirable to avoid moving the contact members 14a and 14b in effecting this adjustment, and I have therefore shown a construction in which plate 16 is held in fixed position within a suitable housing while plate 6 is rotatably mounted.

Thus, the mechanism is shown as enclosed within a metal housing comprising front and rear casing members 31 and 32. The front casing member 31 is provided with a central forwardly extended portion 33 to receive the control bar 11 and the associated contact means and stop members, and the rear end thereof is flanged outward at 34. The rear casing member 32 is provided with an enlarged portion 35 to receive the peripheral portions of plates 6 and 16 between flange 34 and a corresponding flange 36 on said casing member, plate 6 having its peripheral portion offset forwardly as shown at 6'.

A spacer ring 37 is interposed between said flanges to maintain sufficient space therebetween to permit rotation of plate 6. The forward end of casing member 32 is bent inward over flange 34, as shown at 38, to secure the casing members together. When the parts are thus secured, the peripheral portion 6' of plate 6 is in frictional engagement with plate 16 and casing member 32, and may if desired be provided with a roughened surface or with slight indentations at its position of engagement with the casing, for the purpose of holding it in position during initial adjustment and until it is secured in properly adjusted position as described hereinafter.

When the device is intended for operation in response to variations in temperature of air or other gas, the rear casing member 32 is preferably provided with one or more openings 41 to permit access of gas to the bimetallic elements 2a, 2b and 2c.

In order to provide for rotative adjustment of plate 6, it is provided with a projection 42 extending through an arcuate slot of suitable extent, say about 60°, in the housing, members 35 and 37 being cut away as indicated at 35' and 37' to provide said slot.

The brackets 15a, 15b and 18a, 18b are secured to insulating plate 16, as by means of rivets 43. Brackets 15a and 15b are provided with forwardly projecting terminal lugs 44a and 44b which extend with clearance through openings 45 in the casing and may be provided with threaded openings 46 for attaching lead wires. Segment shaped plates 47 of mica or other suitable insulating material are provided inside the upper and lower portions of the front casing member 31, and are secured thereto against relative turning movement by means of rivets 48 and by engagement of their arcuate outer edge portions with the cylindrical side wall portion of said casing member. Said insulating plates 47 are provided with openings 49 through which terminal lugs 44a and 44b extend in close-fitting relation, whereby the engagement of said terminal lugs with said insulating plates serves to prevent rotation of insulating plate 16 and the parts carried thereby, relative to the casing.

The principle of operation of this form of device may best be explained with reference to Fig. 7, which shows the most essential parts somewhat diagrammatically, including shaft 1, bimetallic thrust members 2a, 2b and 2c mounted on supporting plate 6, control bar 11 operatively connected to shaft 1, and stop members 14a, 14b, 17a and 17c mounted on supporting plate 16. This view is generally comparable to Fig. 6 although, for simplicity and clarity of illustration, bar 11 is shown rigidly connected to shaft 1 as in the form shown in Fig. 8, and bar 11 and the associated stop members are shown in a different angular relation to shaft 1 and its supporting thrust members, this particular angular relationship being immaterial.

The device is assembled with the resilient thrust members 2a, 2b and 2c under longitudinal compression, so that each of said members exerts an inward thrust against shaft 1, of sufficient magnitude to require the storing of considerable energy due to tangential force created by a temperature change before the shaft is rotated, so that movement of the shaft will always occur by snap action rather than as a gradual creeping movement. At some given temperature, the thrust members will exert no thrust in a tangential direction, so that the force exerted will be simply an inward force due to the longitudinal compression thereof. The inward force so exerted by thrust member 2a is indicated at $F_1$, which in this position of the thrust member passes through the axis of rotation of the shaft, indicated at 0. Since the thrust members are bimetallic elements as described above, member 2a will exert a tangential component of force in the direction indicated at $T_1$ upon an increase of temperature, and in the direction indicated at $T_D$ upon a decrease of temperature.

If the temperature is increased so as to produce a tangential component of force $T_1$, the resultant force exerted by member 2a is indicated at $R_1$, tending to cause clockwise rotation of shaft 1. The same considerations apply to the other thrust members. When the combined moment of the resultant forces exerted thereby is in a clockwise direction, the control bar is moved to and held in the position indicated, in contact with stop members 14a and 14b. These members are electrical contacts as noted above, and an electrical connection is thus established therebetween.

If the temperature decreases until the combined moment of the resultant forces exerted by the thrust members is in the reverse direction, shaft 1 will be rotated counterclockwise by snap action, moving bar 11 into engagement with stop members 17a and 17b. Thus, upon an increase of temperature above, or a decrease of temperature below, the temperature at which the device is set to operate, the control bar will be moved by snap action to either close or open the electrical connection between contact members 14a and 14b.

If it is desired to set the device to operate at a higher temperature, supporting plate 6 and the thrust members carried thereby may be rotated clockwise relative to supporting plate 16, so as to shift the longitudinal axis of thrust member 2a, for example, to a position such as shown by the dotted line at 2a'. In this position, a certain definite tangential component of force due to temperature, indicated at $T_2$, will be required to produce in combination with inward force $F_2$ a resultant $R_2$ passing through the axis of the shaft, so that a higher temperature is required to cause snap action of the shaft in a clockwise direction to bring bar 11 into engagement with contact members 14a and 14b, while counterclockwise snap action rotation in the reverse direction also occurs at a higher temperature. Since the diameter of shaft is quite small as compared to the effective length of each of the thrust members, rotative adjustment of the supporting plate 6 as above described will not introduce an appreciable change in the magnitude of the inwardly directed force F. Furthermore, the change in magnitude of the tangential component of force produced by such adjustment is relatively small compared to the changes in such component produced by changes in temperature.

Whenever the resultant R of the inward component of force F and the tangential component T exerted by each thrust member passes through the axis of rotation of the shaft, the thrust member tends to produce rotation of the shaft, and when the combined moment produced by the three thrust members passes through zero the shaft is rotated from engagement with one set of stop members into engagement with the other. The shift in position will always occur with snap action because the initial movement increases the lever arm of each thrust member and thus increases the moment in that direction, causing the control bar to snap to its position against the other set of stop members.

Since, as explained above, rotative adjustment of the thrust members serves to vary the tangential component required to produce a resultant force R passing through the axis 0, it will be evident that plate 6 may be rotated by manipulation of the projection 42, to adjust the device for operation at the desired limits of temperature, within the range of temperature limits for which the device is intended. When so adjusted, the plate 6 may be locked in this position, as by soldering, crimping, or otherwise securing the projection 6 tightly to the casing.

The same essential features and principles of operation can be adapted for operation in responses to changes in other conditions than temperature. For operation in response to humidity, the bimetallic elements above described may be replaced by elements that are movable in response to variations in humidity. For example, each of the three resilient thrust members 2a, 2b and 2c may comprise an element of similar shape and relative position to the bimetallic elements, formed of a thin strip of resilient metal bonded to a strip of paper or other material adapted to expand upon absorption of moisture.

A form of snap acting control device responsive to variations in pressure is shown in Fig. 9. The central shaft 51 is rotatably engaged and supported by three angularly spaced Bourdon tubes 52a, 52b and 52c, each of which is resilient and is compressed in a radial direction so as to exert an inward thrust against the shaft. The inner ends of the Bourdon tubes are closed by members 53 provided with knife-edge tips engaging V-shaped grooves or indentations 54 in shaft 51. Each Bourdon tube is connected at its outer end to a lug 55 which is integral with ring 56 secured to an insulating plate 57 by means of releasable clamp members 58, whereby the outer ends of the Bourdon tubes may be rotatably adjusted about the axis of the shaft and secured in the desired relative position. Ring 56 is provided with a nozzle 59 for connection to a source of variable fluid pressure, and said ring and lugs 55 are provided with passages leading from said nozzle to the interiors of the Bourdon tubes.

The Bourdon tubes are of spiral form so that changes in fluid pressure therein will produce changes in thrust substantially perpendicular to the inwardly directed thrust due to radial compression of the tubes. Thus, the directions of thrust due to increase and decrease in pressure are indicated by the arrows at $T_I$ and $T_D$ respectively.

The control member is again shown as an insulating bar 61 operatively connected to shaft 51 and extending substantially perpendicular thereto, said bar being either pivotally mounted on said shaft in the same manner as bar 11 in Figs. 3 to 5 or rigidly connected thereto in the same manner as the bar 11' in Fig. 8.

Stop members 62a, 62b, 63a, and 63b are mounted on supporting plate 57. Members 62a and 62b are positioned to engage the end portions of bar 61 upon rotation in a counterclockwise direction, while members 63a and 63b are positioned to engage the end portions of said bar upon rotation in a clockwise direction, thus serving to limit the rotative movement of the shaft. As before, either one or both of the sets of travel-limiting stop members may also serve as electrical contacts, but I have again shown only members 62a and 62b functioning as contacts, insulating bar 61 being provided with coacting contact members 64a and 64b electrically connected by a conductor strip 65.

The plate 57 may be formed of molded plastic material or other suitable insulating material. Said plate may be supported in fixed position and ring 56 carrying the Bourdon tubes may be rotated thereon by loosening clamps 58; or ring 56 may be supported in fixed position as by means of nozzle 59, and plate 57 carrying the stop members may be rotated thereon; in either case, such rotative adjustment serves to adjust the angular relation between the pressure-responsive resilient thrust members 52a, 52b and 52c and the limits of rotative movement of the shaft as defined by stop members 62a, 62b and 63a, 63b.

The operation of this form of device is substantially the same as described above, except that the changes in the tangential component of thrust tending to cause snap rotation of the control member are effected by variations in flexure of the Bourdon tubes in response to changes in fluid pressure. Referring particularly to Bourdon tube 52c, when the fluid pressure is such as to produce a tangential thrust in the direction indicated at $T_I$ of such magnitude as to produce, in combination with the inwardly directed force due to the resilient compression of the tube, a resultant force R, this tube will tend to cause rotation of shaft 51 in a clockwise direction. When the combined moment produced by the three Bourdon tubes is in that direction the control member 61 is rotated into, and held in, engagement with stop members 63a and 63b, thus opening the electrical circuit. When the combined moment is in the reverse or counterclockwise direction, the bar 61 is rotated by snap action into engagement with stop members 62a and 62b, thus closing electric circuit between connecting leads 67 and 68, through contacts 62a and 64a, conductor strip 65, and contacts 64b and 62b.

For the same reasons as described above in connection with Fig. 7, rotative adjustment of ring 56 with respect to supporting plate 57 serves to change the direction of the inwardly directed component of force exerted by the pressure responsive thrust members, and thus to adjust the device for operation at different values of fluid pressure.

Figure 10:
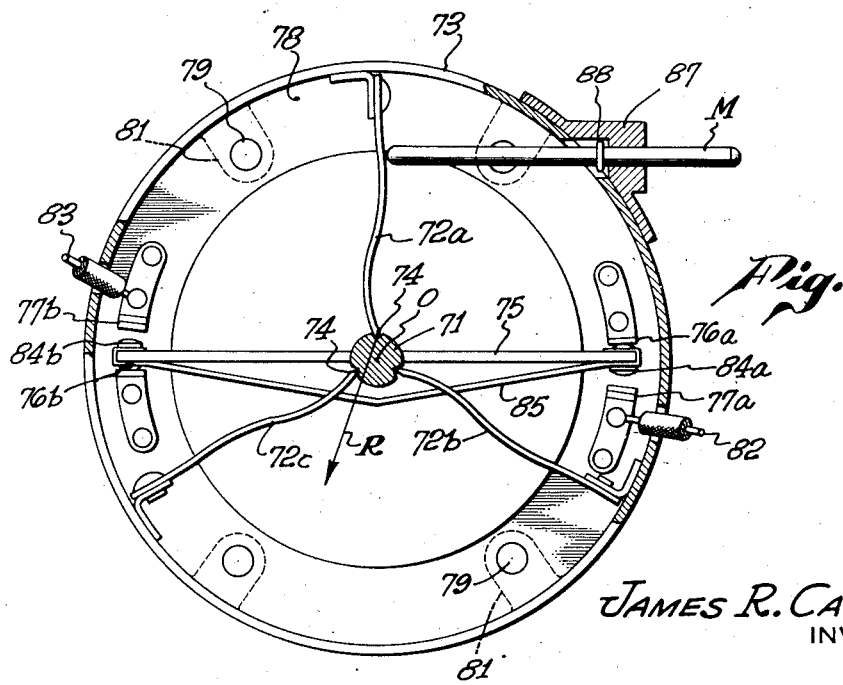
Fig. 10 is a front elevation of another form of device, responsive to mechanical displacement to operate an electric switch.

In Fig. 10 I have shown a form of snap acting control device adapted for operation in response to mechanical displacement of an actuating member M, such mechanical displacement being effected either by manual operation or by suitable mechanical means in remote response to a change of some condition being controlled.

In this case the shaft 71 is rotatably engaged and supported by three angularly spaced resilient thrust members formed as radially extending leaf springs 72a, 72b and 72c. Each of said springs is secured at its outer end to an annular supporting member 73, which may form part of a case for housing the mechanism, and is provided at its inner end with a knife edge tip engaging a V-shaped groove 74 in shaft 71.

Control member 75, formed as an insulating bar, is operatively connected to shaft 71 for rotation therewith, as in either Figs. 3 to 5 or Fig. 8, and stop members 76a, 76b and 77a, 77b are secured to an annular plate 78 of molded plastic material or other suitable insulating material, in position to engage the ends of said control member and limit rotation thereof in counter-clockwise and clockwise directions respectively. Insulating plate 78 is shown secured by rivets 79 to lugs 81 on supporting member 73. Either or both of the sets of stop members may be employed as contact members, but in this case I have shown only members 77a and 77b as electrical contacts, to which terminal wires 82 and 83 are connected, bar 75 being provided with coacting contact members 84a and 84b electrically connected by a conductor strip 85.

The leaf springs 72a, 72b and 72c are shown as bowed longitudinally so as to be resiliently uncompressible, and are assembled in position under considerable radial compression, whereby each of said springs exerts an inwardly directed force against shaft 71 due to such compression. Each of said springs is also normally biased in a direction to exert against said shaft a tangential component of force in a direction tending to produce clockwise rotation of the shaft, whereby contacts 84a and 84b are normally held in engagement with contacts 77a and 77b, to close the electric circuit.

The actuating member M is shown as comprising a pin slidably mounted in a bearing member 87 secured to supporting member 73. The outer end of said pin projects through said bearing member to a position outside the casing, whereby its outer end may be pressed inward manually or by any suitable operating mechanism which may in turn be controlled in response to some condition such as temperature, pressure or humidity. Said pin engages one of the resilient thrust members, such as 72a, at its inner end, and is normally held thereby in an outwardly displaced position and is provided with a shoulder 88 adapted to engage the inner face of bearing member 87 to limit its outward movement. Inward movement of actuating member M exerts a thrust against leaf spring 72a, causing the inner end of said spring to exert against shaft 71 a tangential component in a direction tending to cause counter-clockwise rotation of said shaft. This tangential component, in combination with the inwardly directed force, produces a resultant thrust which is indicated at R, and the arrangement is such that under these conditions the moment of the resultant force R tending to cause counter-clockwise rotation, exceeds the combined opposing moment of the forces exerted by leaf springs 72b and 72c. Shaft 71 and control member 75 are therefore rotated in a counter-clockwise direction, into engagement with stop members 76a and 76b, thus opening the electric circuit.

It will be obvious that, if the device is to operate as a normally open switch instead of being normally closed, stop members 76a and 76b may be formed as contact members and connected to the lead wires 82 and 83, instead of stop members 77a and 77b.

The actuating member M may be positioned so as to engage the resilient thrust member 72a at any desired distance from the inner end of member 72a, thus determining the sensitivity of the device from the standpoint of the amount of travel of said actuating member required to cause snap action of the shaft and control member from one position to the other.

It will be evident that the devices described herein are inherently resistant to effects of vibration. Any vibratory movement tending to increase the tangential component of thrust of one of the thrust members will cause a compensating decrease in thrust of the other members so that the combined forces tending to cause rotation of the central shaft remain substantially unaffected. Furthermore, the rotatably mounted means including the central shaft and the control member (11, 61 or 75) mounted thereon at substantially the mid-length of said member, are substantially rotationally balanced so as to be substantially unaffected by such vibrations. The weight of the control member 11, 61 or 75 and of the contact members carried thereby is equally distributed at opposite sides of the axis of rotation. The center of gravity of the conductor strip 13, 65 or 85 is also relatively closely adjacent the axis of rotation, and its weight may be made so small that any tendency thereof to cause rotation due to vibration is negligible.

Figure 11:
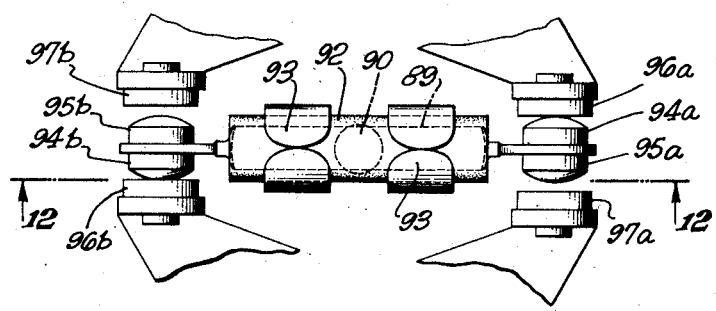
Fig. 11 is a partial vertical elevation (corresponding in aspect to a portion of Fig. 3) showing an advantageous form of rotatably mounted switching means and associated contact members.
Figure 12:
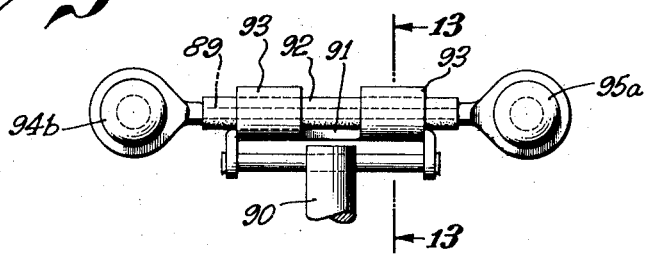
Fig. 12 is a sectional view on line 12—12 in Fig. 11.
Figure 13:
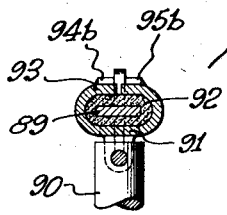
Fig. 13 is a sectional view on line 13—13 in Fig. 12.

The modified form of rotatably mounted control means shown in Figs. 11 through 13 may be substituted for the control bar and contact means shown in any of the above described snap control switch constructions, and is of particular advantage due to its being especially well adapted to provide perfect rotational balancing about the axis of the central shaft. Referring to these figures, the rotatably mounted control means comprises an elongated metal conductor member 89 extending diametrically with respect to the axis of rotation of shaft 90. The central portion of member 89 is secured to a metal strip 91 and is insulated therefrom by one or more layers of insulating material indicated at 92. This insulating covering may advantageously be formed of glass fabric coated or impregnated with a resin or plastic of high insulating quality and good thermal stability, such as a silicone resin or varnish.

Metal strip 91 is shown provided with projecting tabs 93 that are bent over to clamp the member 89 and insulation 92 securely in position, and is preferably connected to shaft 90 so as to permit pivotal or rocking movement of the control means about an axis perpendicular to the axis of the shaft, in the same manner and for the same purpose as described above in connection with strip 23 in Figs. 1 to 6.

The conductor member 89 is formed at its ends to receive suitably disposed contact members. In this case I have shown a contact arrangement adapted for use as a double-throw switch, comprising contact members 94a and 94b corresponding to members 12a and 12b above and additional set of contact members 95a and 95b disposed at the opposite sides of the respective ends of member 89. Fixed contact members 96a and 96b correspond to contacts 14a and 14b above and may be mounted in a similar manner and connected to lead wires in one electric circuit. An additional set of fixed contacts 97a and 97b are mounted in positions corresponding to stop members 77a and 77b and may also be mounted in similar manner and connected to lead wires in another electric circuit.

In the position shown, contact members 94a and 94b are in engagement with contacts 96a and 96b. Snap action rotation in a clockwise direction breaks the connection in this circuit and brings contacts 95a and 95b into engagement with contacts 97a and 97b, closing the other circuit. Thus, contacts 96a, 96b and 97a, 97b act as stop members for limiting rotation of shaft 90 and the control means carried thereby in counter-clockwise and clockwise directions, respectively.

Although the above described devices are shown adapted for operating electric switch means, they may also be adapted to operate other flow controlling means such as valves. By way of example, a temperature-responsive control device similar to that shown in Figs. 1 to 8 but adapted to operate a valve for controlling the flow of fluid is illustrated in Figs. 14 and 15.

The central shaft 101 is resiliently supported by three resilient bimetallic thrust members 102a, 102b and 102c, the relationship, configuration and function of these members being similar to the members 1, 2a, 2b and 2c above, and said members being mounted within a casing 103 formed integrally with or secured to a valve casing 104 provided with fluid inlet and outlet connections 105 and 106. The valve casing is also provided with an inwardly extending flange 107 defining a centrally located port 108 and having a knife-edge valve seat 109.

A control bar 111 is secured to shaft 101 by a rivet 112. At one end of said bar is mounted a valve member 113 carrying a disc 114 adapted to be moved by said bar, upon rotation of shaft 101, into and out of engagement with seat 109. A counterweight 115 is preferably mounted on the other end of bar 111, at the opposite side of the axis of rotation of the shaft, the weight of member 115 being such that the entire rotatably mounted control means comprising shaft 101, bar 111, and the parts carried thereby is substantially rotationally balanced about said axis.

Figure 14:
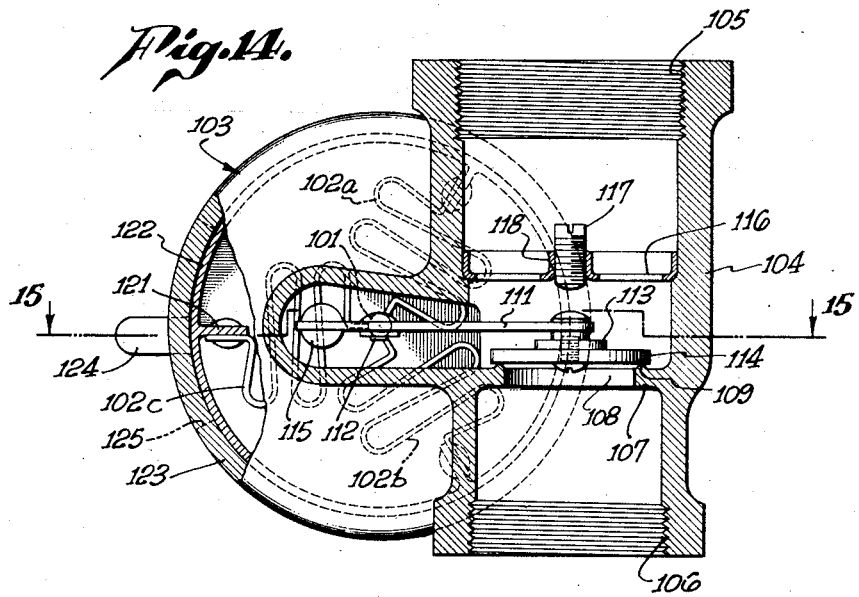
Fig. 14 is a partly sectional front elevation of another modification of the invention, adapted to operate a valve in a fluid passage, in response to variations in temperature.
Figure 15:
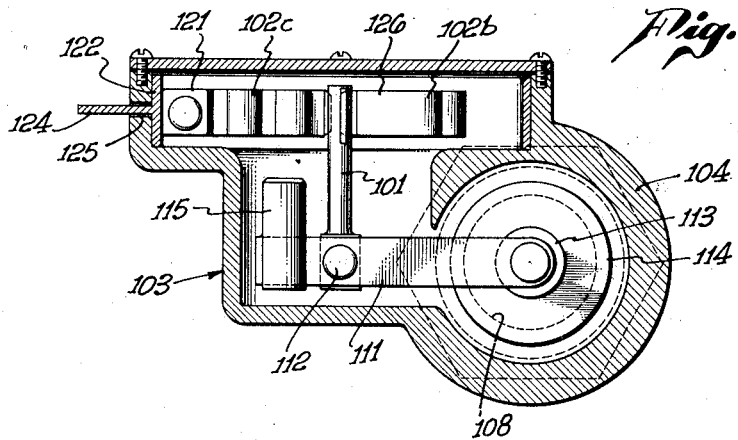
Fig. 15 is a sectional view on line 15—15 in Fig. 14.

Valve seat 109 serves as a stop member limiting rotation of shaft 101 in a clockwise direction in Fig. 14. A perforated plate or spider 116 is secured within the valve casing, and carries a stop member 117 positioned for engagement with valve member 113 to limit rotation of shaft 101 in the opposite direction. Member 117 is shown as a screw-engaging an internally threaded sleeve 118 on plate 116, whereby it may be adjusted to vary the amplitude of the snap action movement of the valve between its closed and open positions.

The resilient bimetallic thrust members 102a, 102b and 102c are preferably mounted for rotative adjustment relative to the stop members defining the limits of rotation of the shaft, in order to provide for adjusting the device to operate at different temperatures in the same manner as described above in connection with Figs. 1 to 6 and Fig. 7. For this purpose, the outer ends of said members may be riveted or otherwise secured to inwardly projecting lugs 121 on a ring 122 rotatably mounted in a cylindrical portion 123 of casing 103. Said ring may be provided with an adjusting arm 124 projecting through a slot 125 in the cylindrical casing portion 123, whereby said ring may be rotated to bring the thrust members 102a, 102b and 102c to the desired position of adjustment. The parts may then be held in this position in any desired manner, as by bending arm 124 into tight engagement with the casing, or by soldering or otherwise securing said arm to the casing. Casing 103 is shown as provided with a suitable cover plate 126 removably secured thereto, and adapted to be secured to said casing after the above described mechanism is placed therein.

The operation of this form of device will be readily apparent in view of the foregoing description of the device shown in Figs. 1 to 6. The bimetallic thrust member may be so disposed as to cause snap action rotation of shaft 101 in a clockwise direction, moving the valve to closed position, when the temperature increases to a predetermined value. When the temperature decreases sufficiently to cause snap action rotation of said shaft in the opposite direction, as described above in connection with Fig. 8, the valve is moved to open position, in engagement with stop member 117, permitting flow of fluid through port 108. The temperature limits at which the snap action movement of the valve occurs are determined by the position of rotative adjustment of the outer ends of the thrust members.

While I have described certain specific devices embodying the novel features and principles of snap acting control devices according to my invention, it is to be understood that the invention includes various obvious modifications embodying the same essential principles. For example, in the temperature-responsive device of the type shown in Figs. 1 through 6, the bimetallic members 2a, 2b and 2c may be made with only one loop extending each side of the radial center line instead of having two loops at each side, as shown. If desired, the number of such loops could also be increased. Furthermore, the looped bimetallic thrust members could be replaced, although somewhat less effectively, by resilient bimetallic members of spiral form having their inner convolutions mounted at angularly spaced positions about the axis of the central shaft and engaging the central shaft at the end of their outer convolutions. The foregoing description serves to illustrate the principles and applications of my invention and is not to be taken as limiting the scope thereof, which is defined in the appended claims.

I claim:

1. In a snap acting control device, the combination which comprises: a shaft; means resiliently supporting said shaft for rotation about a longitudinal axis, comprising at least three resilient members disposed at different angular positions about said shaft and spaced less than 180° apart and each exerting against said shaft a thrust having an inward component toward said axis, at least one of said resilient members being operable to exert against said shaft a thrust having a tangential component and to selectively cause rotation of said shaft in opposite directions by snap action; and stop means for limiting rotative movement of said shaft in each direction.

2. In a snap acting control device, the combination which comprises: a shaft; means resiliently supporting said shaft for rotation about a longitudinal axis, comprising three resilient members disposed at different angular positions about said shaft and spaced less than 180° apart and each exerting against said shaft a thrust having an inward component toward said axis, at least one of said resilient members being operable to exert against said shaft a thrust having a tangential component and to selectively cause rotation of said shaft in opposite directions by snap action; and stop means for limiting rotative movement of said shaft in each direction; said resilient members being angularly adjustable with respect to said stop means.

3. In a snap acting control device, the combination which comprises: a shaft; means resiliently supporting said shaft for rotation about a longitudinal axis, comprising three resilient members disposed at different angular positions about said shaft and spaced less than 180° apart and each exerting against said shaft a thrust having an inward component toward said axis, at least one of said resilient members being operable to exert against said shaft a thrust having a tangential component and to selectively cause rotation of said shaft in opposite directions by snap action; a control member connected to said shaft and operable in opposite directions upon opposite rotational movement of said shaft; and means for limiting movement of said control member in each direction.

4. In a snap acting control device, the combination which comprises: a shaft; means resiliently supporting said shaft for rotation about a longitudinal axis, comprising three resilient members disposed at different angular positions about said shaft and spaced less than 180° apart and each exerting against said shaft a thrust having an inward component toward said axis, at least one of said resilient members being operable to exert against said shaft a thrust having a tangential component and to selectively cause rotation of said shaft in opposite directions by snap action; a control member connected to said shaft for rotation therewith about said axis and substantially rotationally balanced about said axis; and means for limiting rotative movement of said control member in each direction.

5. In a snap acting electric switch device, the combination which comprises: a shaft; means resiliently supporting said shaft for rotation about a longitudinal axis, comprising three resilient members disposed at different angular positions about said shaft and spaced less than 180° apart and each exerting against said shaft a thrust having an inward component toward said axis, at least one of said resilient members being operable to exert against said shaft a thrust having a tangential component and to selectively cause rotation of said shaft in opposite directions by snap action; a control member connected to said shaft for rotation therewith about said axis and provided with electrical contact means; contact means positioned to engage the contact means on the control member upon rotation thereof in one direction and limiting rotation in that direction; and stop means for limiting rotation of said control member in the opposite direction.

6. In a snap acting electric switch device, the combination which comprises: a shaft; means resiliently supporting said shaft for rotation about a longitudinal axis, comprising three resilient members disposed at different angular positions about said shaft and spaced less than 180° apart and each exerting against said shaft a thrust having an inward component toward said axis, at least one of said resilient members being operable to exert against said shaft a thrust having a tangential component and to selectively cause rotation of said shaft in opposite directions by snap action; a control member extending transversely with respect to said axis and connected to said shaft for rotation therewith about said axis, said control member being pivotally mounted on said shaft for movement about an axis extending transversely with respect to the shaft; two contact members mounted on the respective ends of said control member; two coacting contact members positioned for engagement by the respective contact members on the control member upon rotation of said shaft and control member in one direction about said first-mentioned axis and limiting rotation thereof in that direction; and stop means for limiting rotation of said shaft and control member in the opposite direction.

7. In a snap acting device for controlling fluid flow, the combination which comprises: a shaft; means resiliently supporting said shaft for rotation about a longitudinal axis, comprising three resilient members disposed at different angular positions about said shaft and spaced less than 180° apart and each exerting against said shaft a thrust having an inward component toward said axis, at least one of said resilient members being operable to exert against said shaft a thrust having a tangential component and to selectively cause rotation of said shaft in opposite directions by snap action; a control member connected to said shaft for rotation therewith about said axis; a valve member mounted on said control member; a valve seat positioned for engagement by said valve member upon rotation of said control member in one direction and limiting rotation thereof in that direction; and stop means for limiting rotation of said control member in the opposite direction.

8. In a snap acting control device, the combination which comprises: a shaft; three resilient members disposed at different angular positions about said shaft, spaced less than 180° apart, and engaging said shaft at their inner ends to resiliently support the shaft for rotative movement about a longitudinal axis; each of said resilient members exerting against said shaft a thrust having an inward component toward said axis and at least one of said resilient members being responsive to a variable condition to exert against said shaft a tangential component of thrust directed selectively in opposite directions about said axis upon changes in said condition and thereby cause rotation of said shaft in opposite directions by snap action; a control member operatively connected to said shaft for movement in opposite directions upon opposite rotative movements of said shaft; and means for limiting movement of said control member in each direction.

9. In a snap acting control device, the combination which comprises: a shaft; three resilient members disposed at different angular positions about said shaft, spaced less than 180° apart, and engaging said shaft at their inner ends to resiliently support the shaft for rotative movement about a longitudinal axis; each of said resilient members exerting against said shaft a thrust having an inward component toward said axis and being responsive to a condition to be controlled, to exert against said shaft a tangential component of thrust directed selectively in opposite directions about said axis upon changes in said condition; a control member operatively connected to said shaft for movement in opposite directions upon opposite rotative movements of said shaft; and means for limiting movement of said control member in each direction.

10. In a snap acting control device, the combination which comprises: a shaft; three resilient members disposed at different angular positions about said shaft, spaced less than 180° apart, and engaging said shaft at their inner ends to resiliently support the shaft for rotative movement about a longitudinal axis; each of said resilient members exerting against said shaft a thrust having an inward component toward said axis and being responsive to a condition to be controlled, to exert against said shaft a tangential component of thrust directed selectively in opposite directions about said axis upon changes in said condition; a control member operatively connected to said shaft for movement in opposite directions upon opposite rotative movements of said shaft; and stop means for limiting movement of said control member in each direction; said resilient members being angularly adjustable with respect to said stop means.

11. In a snap acting control device, the combination which comprises: a shaft; three resilient members disposed at different angular positions about said shaft, spaced less than 180° apart, and engaging said shaft at their inner ends to resiliently support the shaft for rotative movement about a longitudinal axis; each of said resilient members exerting against said shaft a thrust having an inward component toward said axis and being responsive to a condition to be controlled, to exert against said shaft a tangential component of thrust directed selectively in opposite directions about said axis upon changes in said condition; a control member connected to said shaft for rotation therewith about said axis and substantially rotationally balanced about said axis; and means for limiting rotative movement of said control member in each direction.

12. In a snap acting electric switch device, the combination which comprises: a shaft; three resilient members disposed at different angular positions about said shaft, spaced less than 180° apart, and engaging said shaft at their inner ends to resiliently support the shaft for rotative movement about a longitudinal axis; each of said resilient members exerting against said shaft a thrust having an inward component toward said axis and being responsive to a condition to be controlled, to exert against said shaft a tangential component of thrust directed selectively in opposite directions about said axis upon changes in said condition; a control member connected to said shaft for rotation therewith about said axis and provided with electrical contact means; contact means positioned to engage the contact means on the control member upon rotation thereof in one direction and limiting rotation in that direction; and stop means for limiting rotation of said control member in the opposite direction.

13. In a snap acting electric switch device, the combination which comprises: a shaft; three resilient members disposed at different angular positions about said shaft, spaced less than 180° apart, and engaging said shaft at their inner ends to resiliently support the shaft for rotative movement about a longitudinal axis; each of said resilient members exerting against said shaft a thrust having an inward component toward said axis and being responsive to a condition to be controlled, to exert against said shaft a tangential component of thrust directed selectively in opposite directions about said axis upon changes in said condition; a control member extending transversely with respect to said axis and connected to said shaft for rotation therewith about said axis, said control member being pivotally mounted on said shaft for movement about an axis extending transversely with respect to the shaft; two contact members mounted on the respective ends of said control member; two coacting contact members positioned for engagement by the respective contact members on the control member upon rotation of said shaft and control member in one direction about said first-mentioned axis and limiting rotation thereof in that direction; and stop means for limiting rotation of said shaft and control member in the opposite direction.

14. In a snap acting device for controlling fluid flow, the combination which comprises: a shaft; three resilient members disposed at different angular positions about said shaft, spaced less than 180° apart, and engaging said shaft at their inner ends to resiliently support the shaft for rotative movement about a longitudinal axis; each of said resilient members exerting against said shaft a thrust having an inward component toward said axis and being responsive to a condition to be controlled, to exert against said shaft a tangential component of thrust directed selectively in opposite directions about said axis upon changes in said condition; a control member connected to said shaft for rotation therewith about said axis; a valve member mounted on said control member; a valve seat positioned for engagement by said valve member upon rotation of said control member in one direction and limiting rotation thereof in that direction; and stop means for limiting rotation of said control member in the opposite direction.

15. In a temperature responsive snap acting control device, the combination which comprises: a shaft; three resilient bimetallic members disposed at different angular positions about said shaft, spaced less than 180° apart, and engaging said shaft at their inner ends to resiliently support the shaft for rotative movement about a longitudinal axis; each of said resilient bimetallic members exerting against said shaft a thrust having an inward component toward said axis and being responsive to temperature, to exert said shaft a tangential component of thrust directed selectively in opposite directions about said axis upon changes in temperature; a control member operatively connected to said shaft for movement in opposite directions upon opposite rotative movements of said shaft; and means for limiting movement of said control member in each direction.

16. In a pressure responsive snap acting control device, the combination which comprises: a shaft; three resilient pressure responsive members disposed at different angular positions about said shaft spaced less than 180° apart, and engaging said shaft at their inner ends to resiliently support the shaft for rotative movement about a longitudinal axis; each of said resilient members exerting against said shaft a thrust having an inward component toward said axis and being responsive to pressure to exert against said shaft a tangential component of thrust directed selectively in opposite directions about said axis upon changes in pressure; a control member operatively connected to said shaft for movement in opposite directions upon opposite rotative movement of said shaft; and means for limiting movement of said control member in each direction.

17. In a snap acting control device, the combination which comprises; a shaft; three resilient members disposed at different angular positions about said shaft, spaced less than 180° apart, and engaging said shaft at their inner ends to resiliently support the shaft for rotative movement about a longitudinal axis; each of said resilient members exerting against said shaft a thrust having an inward component toward said axis and also having a tangential component rotatively biasing said shaft in one direction; a movably mounted actuating member adapted to engage and displace one of said resilient members to cause said one member to exert against said shaft a tangential component in the opposite direction to cause rotation of said shaft in said opposite direction; and means for limiting rotation of said shaft in each direction.

JAMES R. CAMPBELL.